March 14, 1967 G. P. SORENSON 3,308,759
RADAR REFLECTOR ROCKET
Filed Feb. 4, 1963

United States Patent Office 3,308,759
Patented Mar. 14, 1967

3,308,759
RADAR REFLECTOR ROCKET
Glenn P. Sorenson, Walnut Creek, Calif., assignor to MB Associates, a corporation of California
Filed Feb. 4, 1963, Ser. No. 255,784
10 Claims. (Cl. 102—49)

The present invention relates, in general, to the field of radar reflectors and, more particularly, to a small rocket which deploys by novel ejection devices, bundles of radar reflector material, whereby said material maintains its integrity and is uniformly dispersed. This system may be employed to disperse bundles of fibrous radar reflector material, called chaff, over wide areas, rendering radar interception techniques useless.

Heretofore, various techniques have been utilized to deploy a variety of radar reflectors whereby enemy radar detection devices are rendered relatively ineffective. Common to all of these techniques is the desirability of effectively covering as large an area as possible. To do this, a large variety of radar reflectors have been developed, but particular advantage has been found, in covering large areas, by utilizing metalized glass fibers or small wires designated as chaff. These chaff fibers have been found to be effective decoys for all radar bands. A typical piece of chaff is made up of 0.0005 inch diameter fiberglass thread upon which a thin coating of metal is placed or, if preferred, a 0.0005 inch diameter tungsten wire, both of which may range from one half to 20 inches long. As may be readily anticipated, great difficulty is encountered during the ejection of chaff bundles by the standard technique of using a pyrotechnic blast. First, it was found that a pyrotechnic blast, usually from a centralized location, would tend to break and shatter the individual fibers, rendering them substantially useless. The second problem encountered was that those fibers which maintained their integrity become entangled with each other in a reaction which has been described as "birdnesting." These phenomena defeat the objective of obtaining an even distribution of chaff fibers. Moreover, with other radar reflectors, pyrotechnic ejection mechanisms have also been found to have the same general disadvantages, that is, destruction of the reflector and lack of uniform reflector dispersal.

A suitable method for accomplishing the desired dispersion of chaff radar reflectors has been devised, in which ejection mechanisms are mechanically tripped by an escapement regulated actuator. In this system, no pyrotechnics of any kind are used. The chaff rocket system includes a small rocket for which a solid propellant motor would be suitable and which is roll stabilized (with an angular velocity for one model of 75 r.p.s.). The rocket contemplated in this invention would be approximately three feet long and about an inch in diameter, although both larger and smaller rockets are contemplated. The rocket further may be launched from various carrier vehicles and programmed to start ejection of chaff bundles at desired distances from its carrier or dispersal medium. Within the scope of this invention both subsonic and supersonic rockets are feasible. At a predetermined time interval after rocket ignition, the mechanical escapement regulated actuator starts to release bundles of chaff at particular intervals. This actuator releases the bundle which will thus move into the airstream as a result of centrifugal force. The aerodynamic forces (unless used in space applications) then completely eject the bundle of radar reflectors from the carrier rocket. There is remaining on the bundle a very thin skin whereby the radar reflectors are protected against initial aerodynamic buffeting.

The bundles will have an angular velocity imparted to them from two sources. First, each bundle will retain the angular velocity it had while in the carrier vehicle. The central axis of the bundle will move away from the rocket in a straight line path tangent to the periphery of the rocket; however, the bundle will also be rotating about its longitudinal axis. In space applications, this centrifugal force may be used to eject and disperse the radar reflectors. In atmospheric applications, a second source of angular velocity which is perpendicular to the first source is available. The bundles will be exposed atmospheric drag forces and may be designed so as to pivot about their aft-ends as they are being ejected. This induces a tumbling motion which may also be used to disperse radar reflectors from their bundles. The use of centrifugal ejection of radar reflectors eliminates problems of "birdnesting" and will insure a uniform reflector deployment. A mechanical release system coupled with aerodynamic ejection and centrifugal force may be used to disperse other radar reflectors or payloads in atmospheric or space applications.

The principal object of the invention is to provide a mechanical ejection mechanism suitable for rocket deployment of chaff radar reflectors.

Another object of this invention is to provide a structural configuration for a small rocket suitable for ejection and uniform dispersion of radar reflectors or other payloads at high velocities.

A further object of this invention is to provide a radar reflector dispersal system which disperses radar reflectors with little or no damage.

A still further object of this invention is to provide a means for utilizing the rotation of the carrier rocket to effectuate the dispersion of radar reflectors.

Other objects and advantages of the invention will be set forth in the following description of the invention and illustrated in the accompanying drawing in which similar reference characters relate to similar components and of which drawing.

Figure 1:
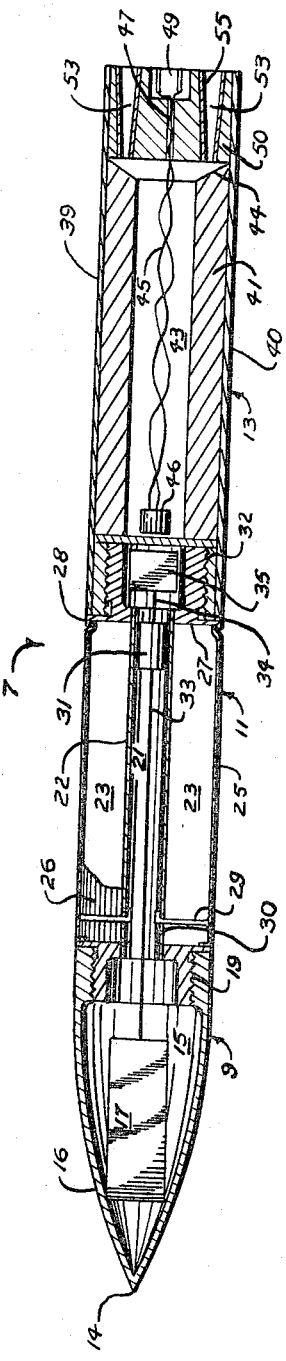
FIGURE 1 is a side view, in section, of a rocket embodying the present invention.

The radar reflector rocket dispersal system is generally shown at 7 in FIGURE 1. It includes a nose section 9, a payload or warhead section 11, and a motor section 13. The nose section 9 has a tangent ogive 16 which terminates in the nose 14. The ogive 16 defines the space 15 which is available for guidance, timing, and sequence mechanisms, all of which are generally enumerated as 17. In small chaff rockets a guidance system would be impractical and unnecessary. However, a suitable mechanism is preferred to drive the actuator 31. Moreover, the nose section 9 may be completely eliminated or be used for the payload or warhead shown at 11 and the actuator 31 may be driven from the release mechanism 35. Alternatively, the release mechanism 35 may be incorporated into the guidance and sequence mechanism 17. The sequence mechanism 17 may or may not include a timing device, but would include an energy storing device such as a clock spring, battery, a pyrotechnic gas generator or a means to utilize ram air pressure. The energy storage device may be started or timed from the ignition of the rocket motor or by many other standardized techniques such as an inertial switch. The nose 9 is provided with a threaded section 19 whereby said nose 9 may be attached to the warhead or payload section 11 after arming.

The payload section 11 has an inner space 21, defined by the tubular wall 22, said wall 22 also defining the compartment 23, chaff fibers 26 or other payloads being disposed in the space 23 which has as its outer boundary the rocket skin means 25. The means forming the bundle compartments 23 are defined at their ends by the partitions 27 which pivot at the point 28 upon release of the free ends of the latch means 29. The latch actuator 31 traverses the channel 21 by means of the connecting mechanism 33, which communicates with the timing and sequence mechanism 17 in the rocket nose 9. The actuator 31 releases the free ends of the latches 29 sequentially urging them longitudinally of wall 22 by thus allowing them to pass through the means defining the opening 30 thereby releasing the section of the rocket skin means which forms a cover portion for the radar reflector compartment 23. The actuator 31 is controlled by the release mechanism 35 which communicates with the actuator 31 through the medium of the connector 34. Combining the rate of release of the actuator 35 with the location of the latches 29, a sequentially arranged release of radar reflector bundles or compartments 23 may be achieved, or if preferred, all latches may be tripped simultaneously.

The channel 21 is shown to be cylindrical, although other configurations may be utilized. The channel wall 22 may be of plastic, aluminum, thin steel or other suitable material designed to withstand axial loading of the rocket during the ejection period of the means forming the compartments 23. The outer skin means 25 remains with the means forming the compartment 23 to help protect the radar reflectors 26. Thus, the compartment means 23 upon ejection by rotation and aerodynamic forces will rotate about the point 28, thereby inducing a tumbling motion in the compartment means. This tumbling may be used to disperse the radar reflectors uniformly and effectively and prevent "birdnesting." As is stated hereinabove, in both space and atmospheric applications, and particularly in the former, the angular velocity of the compartment means 23, as induced by the carrier rocket's rotation, may be used to disperse reflectors 26.

The motor section of the rocket 13 and the warhead 11 are provided with threads 32 whereby the fore and aft sections may be assembled. The motor 13 includes an outer casing 40 with a propellant material 41 disposed therein. The propellant material 41 has a perforation 43 of any desired configuration which is provided with a frusto-conical section 44 and has an igniter 46 with communicating wires 45 disposed therein. The wires 45 pass through the nozzle 50, through the aperture 47 to the rocket triggering mechanism 49. The nozzle 50 is provided with appropriately contoured canted part means 53 which may be lined with heat resistant material 55.

Figure 2:
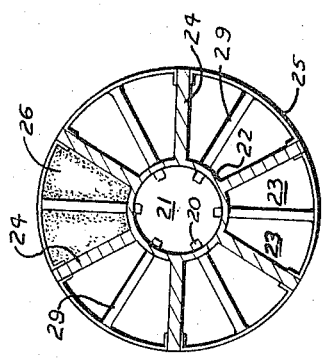
FIGURE 2 is an end view of the warhead of the rocket of the present invention illustrating the latching mechanism and the bundles of radar reflectors.

Referring now to FIGURE 2, the cylindrical tubular means 21 is shown with the latching arm means 29 with their end portions 20 projecting through spaced apertures in said wall. The actuator mechanism 31 releases the latches 29 by moving the end portions 20 thereof forward thus enabling them to be disassociated from the wall 22. A series of axially extending radial vane means 24 formed integrally with the cylindrical wall 22 extend outwardly thereof and together with the skin means form the means by which the chaff is confined to the compartments 23, all of which is best shown in FIG. 2.

Figure 3:
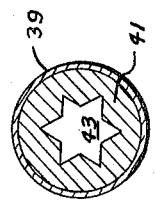
FIGURE 3 is an end view through the motor section of the rocket illustrating a perforation configuration.

The propellant material 41, shown in FIGURE 3, may be a double base or composite propellant such as JPN (double base) or asphalt ammonium-perchlorate (composite). The propellant perforation 43, as shown, has a star cross section to give a constant mass flow rate, but cylindrical and many other cross sections would be suitable depending upon the rocket performance desired. Using the described configuration with a total loaded weight, including payload, of 1260 grams for a rocket approximately 3 feet long and 1¼ inches in diameter with 140 grams of propellant, a burnout velocity of 700 feet per second would be achieved. The burnout velocity may be varied within wide range limits. For example, a burnout velocity of 1300 feet per second can be obtained with a motor with propellant weight of 260 grams and a total loaded weight of 1440 grams.

Figure 4:
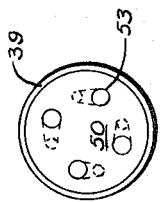
FIGURE 4 is an end view of the rocket nozzle illustrating the nozzle arrangement and whereby rocket stabilization is achieved.

The nozzle ports 53, illustrated in horizontal elevation in FIGURE 4, are shown as skewed to the longitudinal axis of the rocket. A skew angle of approximately 4 degrees for the rocket described heerinabove will cause the rocket to be roll stabilized at an angular velocity of about 75 r.p.s. The nozzle 50 may be made of aluminum, or other lightweight material, and lined with a heat resistant composition such as ceramics or with steel or other suitable nozzle liner materials. Experimentation with models of the same length to diameter ratio as is described has revealed that this rate of spin is sufficient to maintain the rocket projectile in stable flight. This roll stabilization has the effect of averaging out the thrust malalignment and effectively keeps rocket dispersion low. As is noted, the above exact figures are suitable only for this configuration and the necessary motor and warhead configurations for both larger and smaller rockets may be readily designed.

Figure 5:
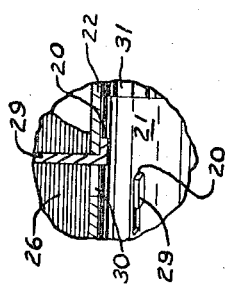
FIGURE 5 is a detailed view of the bundle latching mechanism.

A fragmentary detailed view of the bundle latching mechanism is shown in FIGURE 5 wherein the latch means 29 with end portions 20 are shown projecting through the cylindrical wall preparatory to being motivated by the actuator 31. It is also noted that in this view the latching arm means 29 may be arranged in a staggered manner along the periphery of the wall 22, to thus provide a programmed release of radar reflectors as distinguished from a simultaneous release thereof. While the particular radar reflectors illustrated in the drawing are fiber-like pieces of chaff and form no part of this invention, it is contemplated that an identical technique may be used to deploy other radar reflector configurations and other payloads from rocket projectiles without the use of pyrotechnics.

It would not be departing from the spirit of the invention to place the release mechanism at one end of the warhead 11 and provide a circular path or other path for the actuator 31. This would only require suitable extension of the latching system. The same principle would still apply. Centrifugal force would be used to start ejection of the compartments 23 and aerodynamic forces to provide tumbling and further dispersion.

I claim:

1. In a rocket-type device for dispersing radar reflector means, the combination comprising a cylindrical, elongated, uninterrupted body portion including fore and aft sections, a solid propellant motor in one of said sections and a means for dispersing said radar reflector means in the other of said sections, longitudinally extending tubular means in said other section, radial axially extending vane means associated with said tubular means projecting outwardly thereof to said body portion and thereby providing longitudinally arranged chambers for the radar reflectors, removable skin means forming at least portions of the body portion arranged to retain the radar reflectors in a confined state in said chambers, latch means carried by said skin means projecting inwardly from the surface thereof, means on said latch means adapted to engage said tubular means, longitudinally slidable actuator means positioned in said tubular means and power means for motivating said actuator means, whereby said latch means are disengaged from said tubular means to permit discharge of said radar reflectors from said chambers.

2. In a rocket-type device for dispersing radar reflector means as claimed in claim 1, wherein the solid propellant motor is in the aft section.

3. In a rocket-type device for dispersing radar reflector means as claimed in claim 1, wherein the forward section contains a radar reflector means.

4. In a rocket-type device for dispersing radar reflector means as claimed in claim 1, wherein the axially extending radial vane means extends from the skin means to said tubular means.

5. In a rocket-type device for dispersing radar reflector means as claimed in claim 1, wherein the skin means include coextensive opposed, inturned edge portions adapted to engage the axially extending radial vane means associated with said tubular means.

6. In a rocket-type device for dispersing radar reflector means as claimed in claim 1, wherein the tubular means is provided with means defining openings and in which said latch means include offstanding means at the free ends thereof adapted to be received therein.

7. In a rocket-type device for dispersing radar reflector means as claimed in claim 1, wherein the skin means is pivotally attached to the body of said rocket device.

8. In a rocket-type device for dispersing radar reflector means as claimed in claim 1, wherein spin stabilizing nozzle means are carried by the aft section.

9. In a rocket-type device for dispersing radar reflector means as claimed in claim 1, wherein one of said sections is provided with an externally threaded portion and the other of said sections includes an internally threaded portion adapted to be received thereby.

10. In a rocket-type device for dispersing radar reflector means as claimed in claim 1, wherein the axially extending radial vane means are formed integrally with said tubular means.

References Cited by the Examiner

UNITED STATES PATENTS

| | | | |
|---|---|---|---|
| 757,825 | 4/1904 | Maul | 102—34.1 X |
| 847,198 | 3/1907 | Maul | 102—34.1 |
| 2,476,302 | 7/1949 | Jeppson | 102—34.4 |
| 2,524,591 | 10/1950 | Chandler | 102—49 |
| 2,717,309 | 9/1955 | Cambell | 102—34.1 X |
| 2,748,529 | 6/1956 | Swan | 102—34.1 X |
| 3,049,080 | 8/1962 | Schermuly | 102—34.4 |
| 3,054,584 | 9/1962 | Andras | 102—34.1 |
| 3,064,575 | 11/1962 | Schermuly | 102—37.6 |
| 3,092,027 | 6/1963 | Price | 102—34.1 X |
| 3,095,814 | 7/1963 | Jansen et al. | 102—34.4 X |

SAMUEL FEINBERG, *Primary Examiner.*

R. F. STAHL, *Assistant Examiner.*